United States Patent
Motoaki

[15] 3,679,292
[45] July 25, 1972

[54] CONTINUOUSLY-VARIABLE-MAGNIFICATION AFOCAL LENS SYSTEM

[72] Inventor: Kawazu Motoaki, Kawasaki, Japan
[73] Assignee: Kabushiki Kaisha Ricoh, Tokyo, Japan
[22] Filed: May 17, 1971
[21] Appl. No.: 144,158

[30] Foreign Application Priority Data
May 21, 1970 Japan.................................45/42839

[52] U.S. Cl................................................350/184, 350/202
[51] Int. Cl.....................................................G02b 15/16
[58] Field of Search.................................................350/184

[56] References Cited

UNITED STATES PATENTS 3,464,763  9/1969  Berger...................350/184 X

FOREIGN PATENTS OR APPLICATIONS 945,652  1/1964  Great Britain..........................350/184

Primary Examiner—John K. Corbin
Attorney—Milton J. Wayne and Erwin Koppel

[57] ABSTRACT

A zoom lens for cameras is provided which comprises four groups. The third group consists of a biconcave lens both surfaces of which have the same radius of curvature, and the fourth group consists of a biconvex lens both surfaces of which have the same radius of curvature. In combination of these third and fourth groups with the first and second groups, the spherical aberration as well as astigmatism of the lens system may be limited within a very small range and a flat image is obtained.

2 Claims, 13 Drawing Figures

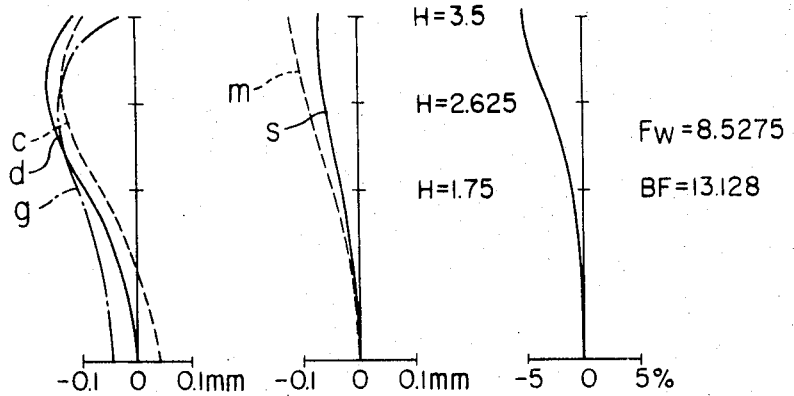
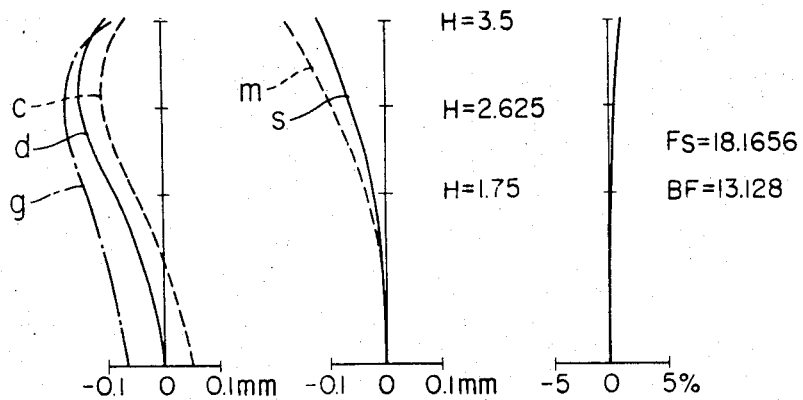
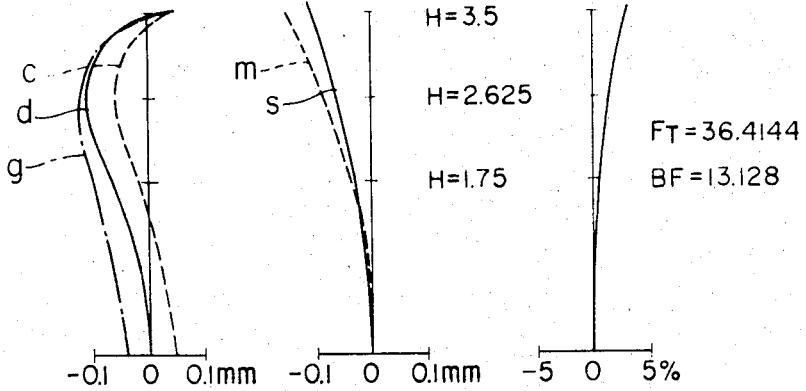

CONTINUOUSLY-VARIABLE-MAGNIFICATION AFOCAL LENS SYSTEM

BACKGROUND OF THE INVENTION

The present invention relates to a continuously-variable-magnification afocal lens system adapted for use in cameras and especially in cinecameras using small-sized films such as 8 mm.

There has not been proposed so far the optical system of the type described which is adapted for mass production and whose spherical aberration as well as astigmatism are limited within a very small range so that a flat image may be obtained.

SUMMARY OF THE INVENTION

One of the objects of the present invention is to provide a new and improved zoom lens for cameras adapted for mass production.

Another object of the present invention is to provide a new and improved zoom lens for cameras whose spherical aberration as well as astigmatism are limited within a very small range so that a flat image may be obtained.

Briefly stated, the optical lens system in accordance with the present invention comprises four groups first group having a positive power, a second and third groups having a negative power and a fourth group having a positive power. The first group consists of a cemented lens element consisting of a negative meniscus lens and a biconvex lens and a positive meniscus lens element; the second group, a biconcave lens element and a cemented lens element consisting of a biconcave lens and a positive meniscus lens; the third group, a biconcave lens element; and the fourth group, a biconvex lens element. The first group is the front lens group which is shifted in response to the distance between the camera and a subject; the second group, a variator which is linearly shifted to vary the magnification; the third group, a compensator for mechanically compensating the shift of the focal length caused by the shift of the variator; and the fourth, a condenser for making the lens system into an afocal system. The radii of curvatures of both surfaces of the concave lens in the third group are the same as well as those of the biconvex lens in the fourth group, so that these lenses may be mass-produced at low cost. However when they are used in combination with the first and second lens groups to be described in more detail hereinafter, the spherical aberration as well as astigmatism may be limited within a very small range so that a flat image may be obtained.

The above and other objects, advantages and features of the present invention will become more apparent from the following description of the preferred embodiment thereof taken in conjunction with the accompanying drawing.

BRIEF DESCRIPTION OF THE DRAWING

FIGS. 3A1, 3B1 and 3C1 illustrate graphs of spherical aberration astigmatism and distortion respectively of the lens system consisting of the variable-magnification afocal lens system and the focusing lens system shown in FIGS. 1 and 2 respectively when the compound focal length is the shortest, FIGS. 3A2, 3A2, 3B2 and 3C2 illustrate similar graphs of aberrations when the compound focal length is medium; and FIGS. 3A3, 3B3 and 3C3 illustrate similar graphs of aberrations when the compound focal length is the longest.

DESCRIPTION OF THE PREFERRED EMBODIMENT

In the instant embodiment to be described below the unit of length is not given because the same effects may be attained in any unit as far as the numerical data give below remain unchanged.

The continuously-variable-magnification afocal lens system in accordance with the present invention satisfies the following conditions.

$r_1 = 83.5$ $d_1 = 2.0$       $n_1 = 1.74077$   $V_1 = 27.7$
$r_2 = 30.0$ $d_2 = 5.5$       $n_2 = 1.60738$   $V_2 = 56.7$
$r_3 = -940.0$ $d_3 = 0.2$
$r_4 = 34.5$ $d_4 = 4.4$       $n_3 = 1.51742$   $V_3 = 52.2$
$r_5 = 1100.0$ $d_5 =$ variable as mentioned below.
$r_6 = -65.8$ $d_6 = 1.5$      $n_4 = 1.74400$   $V_4 = 44.9$
$r_7 = 17.5$ $d_7 = 2.5$
$r_8 = -78.0$ $d_8 = 1.0$      $n_5 = 1.69350$   $V_5 = 53.4$
$r_9 = 10.2$ $d_9 = 4.0$       $n_6 = 1.74077$   $V_6 = 27.7$
$r_{10} = 102.8$ $d_{10} =$ variable as mentioned below.
$r_{11} = -98.0$ $d_{11} = 1.8$  $n_7 = 1.78472$  $V_7 = 25.7$
$r_{12} = 98.0$ $d_{12} =$ variable as mentioned below.
$r_{13} = 41.8$ $d_{13} = 1.8$  $n_8 = 1.69350$  $V_8 = 53.4$
$r_{14} = -41.8$

| $d_5$ | $d_{10}$ | $d_{12}$ | magnification |
|---|---|---|---|
| shortest: 2.17 | 22.82 | 1.65 | 0.472 |
| medium: 16.14 | 5.02 | 5.48 | 1.000 |
| longest: 24.83 | 0.98 | 0.83 | 2.016 | where $r$ with a numerical subscript indicates the radius of curvature of a surface identified by the subscript;

$d$ with a numerical subscript indicates the thickness of a lens or the distance of the air space along the optical axis identified by the subscript;

$n$ with a numerical subscript indicates the refractive index of a lens element identified by the subscript and numbered consecutively from the front to the rear being measured with d-line of helium;

$V$ with a numerical subscript indicates the reciprocal of the dispersive power of a lens identified by the subscript, the refractive index and the dispersive power being measured with the $d$-line of helium.

The continuously-variable-magnification afocal lens system of the instant embodiment has a magnification between 0.472 and 2.016.

Figure 1:
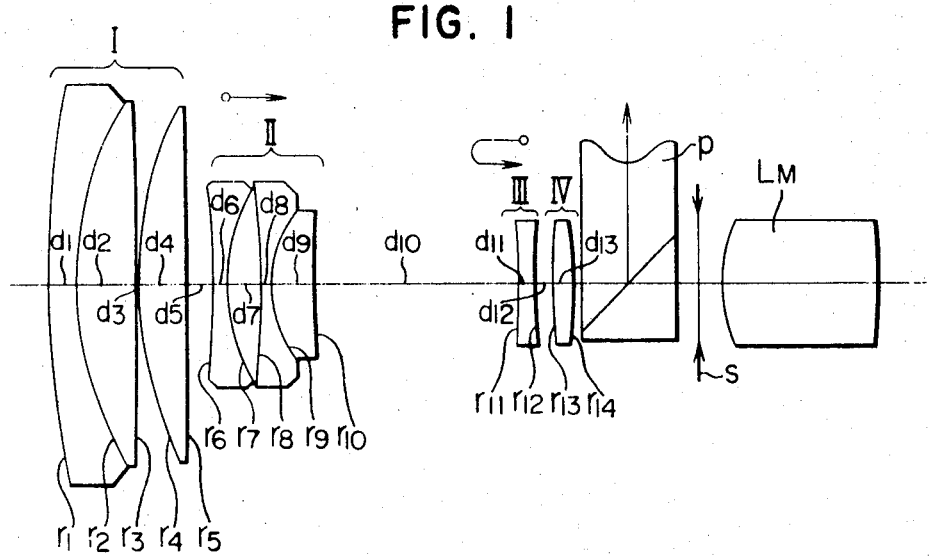
FIG. 1 is a longitudinal sectional view of the continuously-variable-magnification afocal lens system in accordance with the present invention.
Figure 2A:
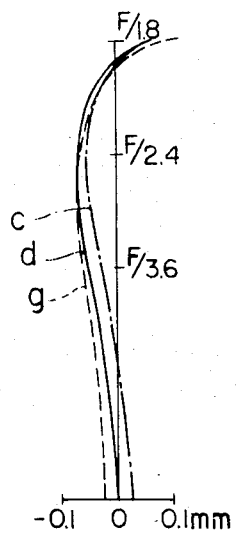
FIGS. 2A 2B and 2C illustrate graphs of aspherical aberration, astigmatism and distortion of a focusing lens system which is used in combination with the variable-magnification afocal lens system shown in FIG. 1 in the embodiment.
Figure 2B:
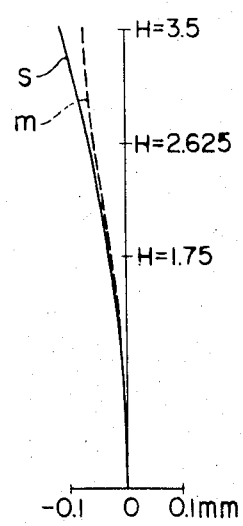
Figure 2C:
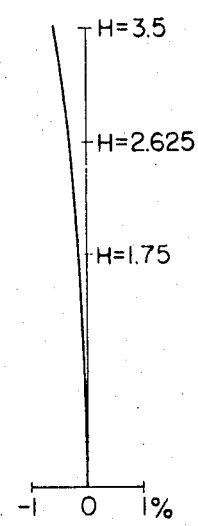

Between the continuously-variable-magnification afocal lens system and the focusing lens system $L_M$ is interposed a prism P whose hypotenuse face is made into a semitransparent or half mirror for redirecting the reflected light toward a view finder of a single-lens reflex camera. The distance of the air space between the fourth group IV and the center of the prism P along the optical axis is 0.5; the thickness of the prism P, 8.5; and the distance of the air space, in which is inserted a stop S, between the centers of the prism P and the focusing lens system $L_M$ is 4.0. The data of the focusing lens system are $f=18.0656$, $BF$ (back focusing length)$=13.128$ and $F=1.8$ with the aberration shown in FIGS.2A–2C. In this case the aberrations of the overall lens system are shown in FIGS.3A1–3C3. In the graphs of the aberrations, H indicates ray height; $d$, a wavelength of 587.6 mili-microns; $g$, a wavelength of 435.8 milimicrons, $c$, a wavelength of 656.3 mili-microns; $m$, the meridian plane; $s$, the sagittal plane; $F_W$, the shortest focal length of the combined optical system; $F_S$, the medium focal length; and $F_T$, the shortest focal length. The Seidel sums are given below:

|  | εSI | εSII | εSIII | εSIV | εSV |
|---|---|---|---|---|---|
| Focusing lens system: | 0.3400 | 0.1797 | −0.0436 | 0.4962 | 0.2833 |
| Fw= 8.5275 | 1.1668 | 0.2222 | 0.0504 | 0.1112 | 0.8482 |
| Fs=18.0656 | 0.5393 | 0.2682 | 0.0716 | 0.2300 | −0.1914 |
| $F_T$=36.4144 | 0.2043 | 0.2115 | 0.2460 | 0.4309 | −0.4507 | where
SI = Seidel sum of spherical aberration;
SII = Seidel sum of coma;
SIII = Seidel sum of astigmatism;
SIV = Seidel sum of curvature of field; and
SV = Seidel sum of distortion.

What is claimed is:

1. A continuously-variable-magnification afocal lens system comprising four lens group,
   a first group consisting of a cemented lens element consisting of a negative meniscus lens and a biconvex lens and a positive lens element,
   a second group consisting of a biconcave lens element and a cemented lens consisting of a biconcave lens and a positive meniscus lens,
   a third group consisting of a biconcave lens element,
   a fourth group consisting of a biconvex lens element,
   said lenses satisfying the following relations:

$r_1 = 83.5$ $d_1 = 2.0$ $\quad n_1 = 1.74077$ $\quad V_1 = 27.7$
$r_2 = 30.0$ $d_2 = 5.5$ $\quad n_2 = 1.60738$ $\quad V_2 = 56.7$
$r_3 = -940.0$ $d_3 = 0.2$
$r_4 = 34.5$ $d_4 = 4.4$ $\quad n_3 = 1.51742$ $\quad V_3 = 52.2$
$r_5 = 1100.0$ $\quad d_5 =$ variable as mentioned below.
$r_6 = -65.8$ $d_6 = 1.5$ $\quad n_4 = 1.74400$ $\quad V_4 = 44.9$
$r_7 = 17.5$ $d_7 = 2.5$
$r_8 = -78.0$ $d_8 = 1.0$ $\quad n_5 = 1.69350$ $\quad V_5 = 53.4$
$r_9 = 10.2$ $d_9 = 4.0$ $\quad n_6 = 1.74077$ $\quad V_6 = 27.7$
$r_{10} = 102.8$ $\quad d_{10} =$ variable as mentioned below.
$r_{11} = -98.0$ $d_{11} = 1.8$ $\quad n_7 = 1.78472$ $\quad V_7 = 25.7$
$r_{12} = 98.0$ $d_{12} =$ variable as mentioned below.
$r_{13} = 41.8$ $d_{13} = 1.8$ $\quad n_8 = 1.69350$ $\quad V_8 = 53.4$
$r_{14} = -41.8$

|  | $d_5$ | $d_{10}$ | $d_{12}$ | magnification |
|---|---|---|---|---|
| shortest: | 2.17 | 22.82 | 1.65 | 0.472 |
| medium: | 16.14 | 5.02 | 5.48 | 1.000 |
| longest: | 24.83 | 0.98 | 0.83 | 2.016 | where r with a numeral subscript indicates the radius of curvature of a surface identified by the subscript; d with a numerical subscript indicates the thickness of a lens or the distance of the air space along the optical axis identified by the subscript; n with a numerical subscript indicates the refractive index of a lens element identified by the subscript, the lenses being numbered consecutively from the front to the rear; and V with a numerical subscript indicates the reciprocal of the dispersive power of a lens identified by the subscript, the refractive index as well as the dispersive power being measured with the d-line of helium.

2. The continuously-variable-magnification afocal lens system as set forth in claim 1 wherein said r and d are the products of the numerical values given in claim 1, multiplied by a proportionality constant.

* * * * *